United States Patent
Kim et al.

(10) Patent No.: US 7,551,589 B2
(45) Date of Patent: Jun. 23, 2009

(54) FRAME STRUCTURE OF UPLINK CONTROL INFORMATION TRANSMISSION CHANNEL IN MIMO COMMUNICATION SYSTEM

(75) Inventors: Bong-Hoe Kim, Gyeonggi-Do (KR); Dong-Youn Seo, Seoul (KR); Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 11/097,013

(22) Filed: Mar. 31, 2005

(65) Prior Publication Data

US 2005/0219999 A1 Oct. 6, 2005

Related U.S. Application Data

(60) Provisional application No. 60/559,305, filed on Apr. 2, 2004.

(51) Int. Cl.
*H04J 3/00* (2006.01)
*H04B 7/204* (2006.01)
*H04W 72/00* (2009.01)

(52) U.S. Cl. .................. 370/335; 370/329; 370/326; 455/452.1

(58) Field of Classification Search .......... 455/452.2, 455/450, 67.1, 452, 522; 370/342, 310.1, 370/335, 329, 326; 375/267, 299
See application file for complete search history.

(56) References Cited

U.S. PATENT DOCUMENTS

| 6,778,612 | B1 * | 8/2004 | Lozano et al. ............ 375/299 |
| 7,120,199 | B2 * | 10/2006 | Thielecke et al. ......... 375/267 |
| 2002/0093937 | A1 | 7/2002 | Kim et al. |
| 2002/0141367 | A1 * | 10/2002 | Hwang et al. ............. 370/335 |
| 2002/0159431 | A1 * | 10/2002 | Moulsley et al. .......... 370/347 |
| 2003/0067890 | A1 * | 4/2003 | Goel et al. .............. 370/310.1 |
| 2003/0073409 | A1 * | 4/2003 | Nobukiyo et al. ......... 455/67.1 |
| 2003/0108013 | A1 * | 6/2003 | Hwang et al. ............. 370/335 |
| 2003/0148738 | A1 | 8/2003 | Das et al. |
| 2003/0185159 | A1 | 10/2003 | Seo et al. |
| 2004/0058687 | A1 | 3/2004 | Kim |
| 2004/0131038 | A1 * | 7/2004 | Kim et al. ................. 370/342 |
| 2004/0152458 | A1 | 8/2004 | Hottinen |
| 2004/0224697 | A1 * | 11/2004 | Hakkinen et al. ......... 455/450 |
| 2005/0068921 | A1 * | 3/2005 | Liu ......................... 370/335 |

FOREIGN PATENT DOCUMENTS

| EP | 1207635 | 5/2002 |
| EP | 1 255 369 A1 | 11/2002 |
| EP | 1388964 | 2/2004 |
| JP | 2003-244045 | 8/2003 |

* cited by examiner

*Primary Examiner*—Charles N Appiah
*Assistant Examiner*—Kiet Doan
(74) *Attorney, Agent, or Firm*—Lee, Hong, Degerman, Kang & Waimey

(57) ABSTRACT

A frame structure of an uplink control information transport channel in the MIMO communication system using multiple transmission antennas and multiple reception antennas, constructed such that an uplink control information transport channel for transmitting control information with respect to each of the multiple transmission antennas includes three fields: a field for acknowledgement (ACK)/negative acknowledgement (NACK) for HARQ (Hybrid Automatic Retransmission Request), a field for CQI (Channel Quality Information) and a field for weight value information with respect to each transmission antenna. Because the control information for controlling each transmission antenna is effectively transmitted, signals transmitted at each transmission antenna of the MIMO system can be controlled in real time.

8 Claims, 4 Drawing Sheets

FRAME STRUCTURE OF UPLINK CONTROL INFORMATION TRANSMISSION CHANNEL IN MIMO COMMUNICATION SYSTEM

CROSS-REFERENCE TO RELATED APPLICATIONS

Pursuant to 35 U.S.C. §119(a), this application claims the benefit of earlier filing date and right of priority to U.S. Provisional Application No. 60/559,305, filed on Apr. 2, 2004; the contents of which is hereby incorporated by reference herein in its entirety.

BACKGROUND OF THE INVENTION

1. Field of the Invention

The present invention relates to a frame structure of an uplink control information transmission channel in a communication system called a multi-input/multi-output (MIMO) system in which transmitting and receiving ends commonly use multiple antennas.

2. Description of the Related Art

FIGS. 1 and 2 show a related art MIMO communication system employing a PARC (Per-Antenna Rate Control) method.

The PARC refers to a method based on the construction of a V-BLAST (Vertical Bell Laboratories Layered Space Time) system, one of conventional techniques of the MIMO system, in which symbols of signals are differently channel-coded and modulated according to each transmission antenna in a transmitting end with reference to channel information determined at a receiving end and then the corresponding signals are transmitted through each transmission antenna.

FIG. 1 is a view showing the construction of the transmitting end of the related art MIMO communication system employing the PARC method. The operation of the MIMO communication system employing the PARC method will now be described with reference to FIG. 1.

High speed data streams sequentially generated from the transmitting end is demultiplexed through a demultiplexer DEMUX 110 so as to be transmitted from each of multiple transmission antennas. Herein, the demultiplexing means dividing consistent data into a plurality of sub-data according to a determined regulation. FIG. 1 shows two antennas for the sake of explanation.

The demultiplexed sub-streams of each transmission antenna are coded and interleaved in signal processors 121 and 122, and then mapped to a symbol, respectively.

The mapped symbols are inputted to a spreader 131 in which a spreading codel is multiplied thereto, coded into a scrambling code, and then transmitted to respective transmission antennas 161 and 162.

If a user occupies 10 channels discriminated by the spreading code, the divided sub-streams are divided again into 10 sub-streams, respectively. Respective divided data symbols are inputted into spreaders 131~133, in which each spreading code 1~10 is multiplied thereto, added in adders 141 and 142, coded into a scrambling code, and then, transmitted through respective transmission antennas 161 and 162. Herein, generally, one scrambling code is allocated per user. The number of bits allocated to the transmission antennas 161 and 162 can differ depending on a designated data rate.

The coding is made only in a temporal dimension, so its data restoration performance is not as high as that in the space-time coding which is used in a single-rate system. The coding in the temporal domain allows post-decoding interference cancellation, by which performance of a receiver is enhanced.

FIG. 2 is a view showing the construction of a related art receiving end of the MIMO communication system employing the PARC method. The operation of the receiving end of the MIMO communication system employing the PARC method will now be described with reference to FIG. 2.

After the data is demultiplexed and then coded into the scrambling code in the transmitting end, the signals of each transmission antenna can be independently decoded in the receiving end as shown in FIG. 2.

In other words, when the reception antennas 211 and 212 receive the symbol, symbols of each channel are estimated in a symbol detector according to a minimum mean square error (MMSE) method, despread and multiplexed by despreaders 241 and 242 and a multiplexer 250 so that a signal with respect to one antenna can be detected, and the detected signal is relocated (demapped), deinterleaved and then decoded in a signal processor 260.

Thereafter, a signal with respect to the antenna is reconfigured in a signal remover 270 based on the decoded bits and then the reconfigured signal is removed from a reception signal stored in a buffer.

Signals of other antennas are processed in the same manner and along the same path, and then coupled by a coupler 280.

The PARC is a MIMO system technique for a high speed downlink packet access (HSDPA) proposed by Lucent, which allows, unlike the V-BLAST, each transmission antenna to use a different data transmission rate to thereby increase a transmission capacity. In this case, the transmitting end transmits an encoded signal independent by transmission antennas.

The PARC system is different from the V-BLAST system, the existing single-rate MIMO technique in the aspect that each antenna has a different data transmission rate (modulation and coding).

Namely, the PARC system allows each antenna to control the data transmission rate independently more minutely, which leads to enhancement of a substantial transmission capacity of an overall system. In this case, although more bits are required for informing about a state of channels of each antenna than in techniques proposed for the single rate MIMO system, a reference set can be determined.

In other words, in the PARC system, in order to determine a MCS (modulation & Coding Scheme) set valid for each antenna, an SINR (Signal to Interference Noise Ratio) of each transmission antenna as received by each reception antenna is calculated.

At this time, in order to select a channel coding and modulation method to be used at each antenna, the SINR received through each antenna is measured, based on which a combination of a channel coding method and a modulation method to be used at each antenna is selected.

[Table 1] and [Table 2] show examples of combinations of transmission rate of transmitted data and an MCS in the MIMO system having four transmission antennas and four reception antennas.

TABLE 1

| bps/Hz | Data rate (Mbps) | Constellation | Coding rate |
|---|---|---|---|
| 3 | 7.2 | 16 QAM | 3/4 |
| 2 | 4.8 | 16 QAM | 1/2 |
| 1.5 | 3.6 | QPSK | 3/4 |

TABLE 1-continued

| bps/Hz | Data rate (Mbps) | Constellation | Coding rate |
|---|---|---|---|
| 1 | 2.4 | QPSK | ½ |
| 0.5 | 1.2 | QPSK | ¼ |

TABLE 2

| Index | Rate: Mbps | Ant1 | Ant2 | Ant3 | Ant4 |
|---|---|---|---|---|---|
| 1 | 28.8 | 3 | 3 | 3 | 3 |
| 2 | 26.4 | 3 | 3 | 2 | 3 |
| 3 | 26.4 | 3 | 2 | 3 | 3 |
| 4 | 26.4 | 2 | 3 | 3 | 3 |
| 5 | 24.0 | 2 | 3 | 3 | 2 |
| 6 | 24.0 | 2 | 3 | 2 | 3 |
| 7 | 24.0 | 2 | 2 | 3 | 3 |
| 8 | 21.6 | 2 | 2 | 3 | 2 |
| 9 | 21.6 | 2 | 2 | 2 | 3 |
| 10 | 19.2 | 2 | 2 | 2 | 2 |
| 11 | 22.8 | 2 | 1.5 | 3 | 3 |
| 12 | 20.4 | 2 | 1.5 | 2 | 3 |
| 13 | 18.0 | 2 | 1.5 | 2 | 2 |
| 14 | 19.2 | 2 | 1.5 | 1.5 | 2 |
| 15 | 16.8 | 2 | 1 | 2 | 2 |
| 16 | 25.2 | 1.5 | 3 | 3 | 3 |
| 17 | 22.8 | 1.5 | 3 | 2 | 3 |
| 18 | 22.8 | 1.5 | 2 | 3 | 3 |
| 19 | 20.4 | 1.5 | 2 | 2 | 3 |
| 20 | 18.0 | 1.5 | 2 | 2 | 2 |
| 21 | 19.2 | 1.5 | 2 | 1.5 | 2 |
| 22 | 21.6 | 1.5 | 1.5 | 3 | 3 |
| 23 | 21.6 | 1.5 | 1.5 | 3 | 3 |
| 24 | 16.8 | 1.5 | 1.5 | 2 | 2 |
| 25 | 14.4 | 1.5 | 1.5 | 2 | 1 |
| 26 | 15.6 | 1.5 | 1.5 | 1.5 | 2 |
| 27 | 15.6 | 1.5 | 1 | 2 | 2 |
| 28 | 24.0 | 1 | 3 | 3 | 3 |
| 29 | 21.6 | 1 | 3 | 2 | 3 |
| 30 | 21.6 | 1 | 2 | 3 | 3 |
| 31 | 19.2 | 1 | 2 | 2 | 3 |
| 32 | 16.8 | 1 | 2 | 2 | 2 |
| 33 | 15.6 | 1 | 2 | 2 | 1.5 |
| 34 | 15.6 | 1 | 2 | 1.5 | 2 |
| 35 | 18.0 | 1 | 1.5 | 2 | 3 |
| 36 | 15.6 | 1 | 1.5 | 2 | 2 |
| 37 | 20.4 | 0.5 | 2 | 3 | 3 |
| 38 | 15.6 | 0.5 | 2 | 2 | 2 |
| 39 | 14.4 | 3 |  | 3 |  |
| 40 | 14.4 |  | 3 |  | 3 |
| 41 | 12.0 | 3 |  | 2 |  |
| 42 | 12.0 |  | 3 |  | 2 |
| 43 | 12.0 | 2 |  | 3 |  |
| 44 | 12.0 |  | 2 |  | 3 |
| 45 | 9.6 | 2 |  | 2 |  |
| 46 | 9.6 |  | 2 |  | 2 |
| 47 | 8.4 | 2 |  | 1.5 |  |
| 48 | 8.4 |  | 2 |  | 1.5 |
| 49 | 10.8 | 1.5 |  | 3 |  |
| 50 | 10.8 |  | 1.5 |  | 3 |
| 51 | 8.4 | 1.5 |  | 2 |  |
| 52 | 8.4 |  | 1.5 |  | 2 |
| 53 | 9.6 | 1 |  | 3 |  |
| 54 | 9.6 |  | 1 |  | 3 |
| 55 | 7.2 | 3 |  |  |  |
| 56 | 7.2 |  | 3 |  |  |
| 57 | 4.8 | 2 |  |  |  |
| 58 | 4.8 |  | 2 |  |  |
| 59 | 3.6 | 1.5 |  |  |  |
| 60 | 3.6 |  | 1.5 |  |  |
| 61 | 2.4 | 1 |  |  |  |
| 62 | 2.4 |  | 1 |  |  |
| 63 | 1.2 | 0.5 |  |  |  |
| 64 | 1.2 |  | 0.5 |  |  |

As shown in [Table 1], when the modulation method is performed at 16QAM and a coding rate is 3/4, the data rate is the maximum, which corresponds the number of transmission bits per unit frequency of 3. And this case can be matched to a case where the SINR calculated at the reception antenna is the maximum.

The next fastest data rate is when the modulation method is performed at the 16QAM and the coding rate is 1/2, which corresponds the number of transmission bits per unit frequency of 2. In this manner, each number of transmission bits per unit frequency is determined according to the modulation methods and the coding rates, and the number of transmission bits per unit frequency is allocated to the four transmission antennas of [Table 2].

[Table 2] shows examples of combinations of transmission rates in the system using four transmission antennas and four reception antennas. In [Table 2], the index '1' indicates that the number of transmission bits per unit frequency of each of the four transmission antennas is 3 and a data transmission rate is the highest, namely, 28.8.

In such a 4×4 PARC system (namely, the PARC system having four transmission antennas and four reception antennas), in case of the indices from 1 to 38 having a good channel situation because of the relatively shorter distance between the transmitting end and the receiving end, the four transmission antennas can be all used to transmit data, but in case of the indices from 39 to 54 having a bad channel situation because of a relatively longer distance between the transmitting end and the receiving end, two antennas with the larger number of transmission bits per unit frequency are selected from the four transmission antennas to transmit data therethrough.

In the afore-mentioned related art, a serial-to-parallel stage for distributing data generated in a transmitting end to each transmission antenna is provided so that signals can be independently transmitted from each transmission antenna, and a receiving end detects the signals transmitted from each transmission antenna and processes them. In addition, each transmission antenna of the transmitting end can use a different coding and modulation method, which is determined by the receiving end and feeds corresponding information back to the transmitting end.

FIG. 3 illustrates a structure of an uplink channel in the related art MIMO system.

With reference to FIG. 3, a dedicated physical channel (DPCH), among uplink channels transmitted from a receiving end (namely, a terminal) to a transmitting end (namely, a base station) includes 15 slots (305), and each slot (305) includes a dedicated physical data channel (DPDCH) 310 and a dedicated physical control channel (DPCCH) 320.

The DPCCH includes a pilot symbol 322 for estimating channel information, frame merge information (transport format combination indicator (TFCI) 324 having SF (spreading factor) information of an uplink channel, feedback information (FEB) 326, namely, a feedback signal including and carrying information for transmit diversity, and power control bits (TPC: Transmit Power Control) 328 having power control information.

The DPDCH 310 includes substantial data 312 of a user.

FIG. 4 illustrates a structure of the uplink channel in a related art HSDPA system.

With reference to FIG. 4, in the conventional HSDPA system, in order to allow each transmission antenna of the transmitting end to use a different coding and modulation method, certain information is fed back from the receiving end to the transmitting end through an HS-DPCCH (HS-Dedicated Physical Control Channel) 400.

At this time, the HS-DPCCH 400 includes a frame structure having two frames: a field 410 to which ACK/NACK for an HARQ (Hybrid Automatic Retransmission Request) is allocated and a field 420 to which CQI (Channel Quality Information) is allocated. The ACK/NACK has the size of one slot and the CQI has the size of 2 slots.

The related art HSDPA uses a single transmission antenna, so it can transmit the feedback information through one HS-DPCCH.

However, in case of a multiple input/output systems, namely, the MIMO system, because a modulation method, a coding rate and the ACK/NACK information can be set to be different with respect to multiple transmission antennas, a control signal with respect to each transmission antenna needs to be fed back.

SUMMARY OF THE INVENTION

Therefore, an object of the present invention is to provide a frame structure of an uplink control information transport channel in a multi-input/multi-output (MIMO) communication system capable of effectively transmit control information from a receiving end to a transmitting end in applying an HSDPA to the MIMO system.

To achieve at least the above objects in whole or in parts, there is provided a frame structure of an uplink control information transport channel in the MIMO communication system using multiple transmission antennas and multiple reception antennas, constructed such that an uplink control information transport channel for transmitting control information with respect to each of the multiple transmission antennas includes a frame having three fields: a field for acknowledgement (ACK)/negative acknowledgement (NACK) for HARQ (Hybrid Automatic Retransmission Request), a field for CQI (Channel Quality Information) and a field for weight value information with respect to each transmission antenna.

The frame is a radio frame, and each of the three fields has one slot, respectively.

The uplink control signal transport channel is divided into sections as many as the transmission antennas, and each section includes the frame consisting of the three fields allocated to each transmission antenna.

The uplink control signal transport channels are provided as many as the number of transmission antennas, and each of the multiple uplink control signal transport channel includes the frame consisting of three fields allocated to each transmission antenna.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention proposes a method for effectively transmitting control information for controlling each transmission antenna in the MIMO system, whereby a signal transmitted from each transmission antenna of the MIMO system can be controlled in real time.

In applying the related art HSDPA system to the MIMO system, a different data transmission rate (modulation and coding) is applied to each transmission antenna according to a channel situation of each transmission antenna, so that a data transmission rate of each transmission antenna can be more minutely controlled independently.

For this purpose, a receiving end must feed back certain control information to each transmission antenna, and in this case, the certain control information includes the ACK/NACK for HARQ, the CQI and FBI (Feedback Information).

The CQI includes information on a transport block size and a modulation method, information on the number of HS-DSCHs and power offset information with respect to a DPDCH for transmitting the HS-DSCH.

The FBI means weight information transmitted to each transmission antenna of the transmitting end by the receiving end.

In the present invention, such control information is transmitted through the certain uplink control information transport channel, and in this case, the certain uplink control information transport channel includes the frame having the three fields of the ACK/NACK for the HARQ, the CQI and the weight information with respect to each transmission antenna.

A preferred embodiment of the present invention will now be described with reference to the accompanying drawings.

The present invention assumes a closed-loop MIMO mobile communication system and an FDD system, and a receiving end feeds back a situation of a forward channel because a movement channel situation from a transmitting end to the receiving end cannot be known. However, in the TDD system, because the forward channel and a reverse channel are the same, although the receiving end does not feedback, the transmitting end can estimate the forward channel.

In the preferred embodiment of the present invention, it is assumed that a MIMO system has the M number of transmission antennas 310 and the N number of reception antennas 410 (in this case N≧M).

Figure 5:
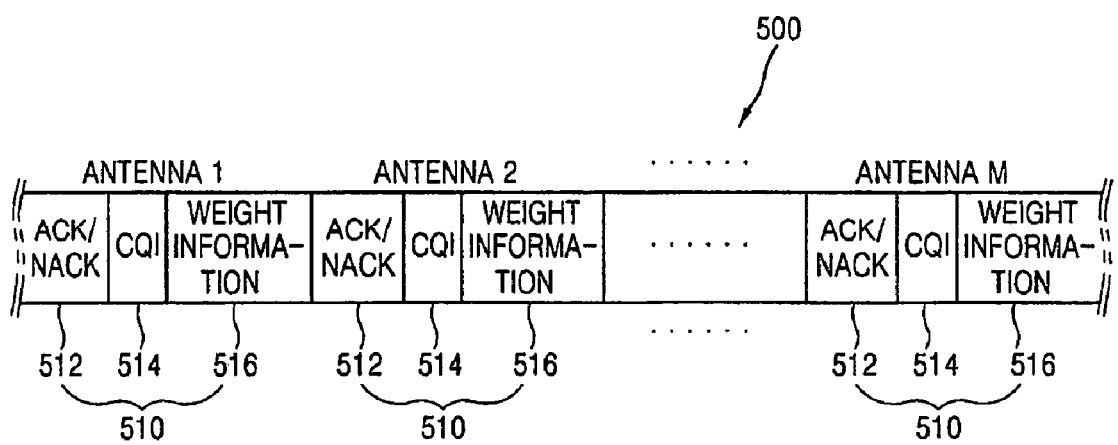
FIG. 5 is a view showing an uplink control information transport channel in a MIMO communication system in accordance with one embodiment of the present invention.

FIG. 5 is a view showing an uplink control information transport channel in a MIMO communication system in accordance with one embodiment of the present invention.

Figure 1:
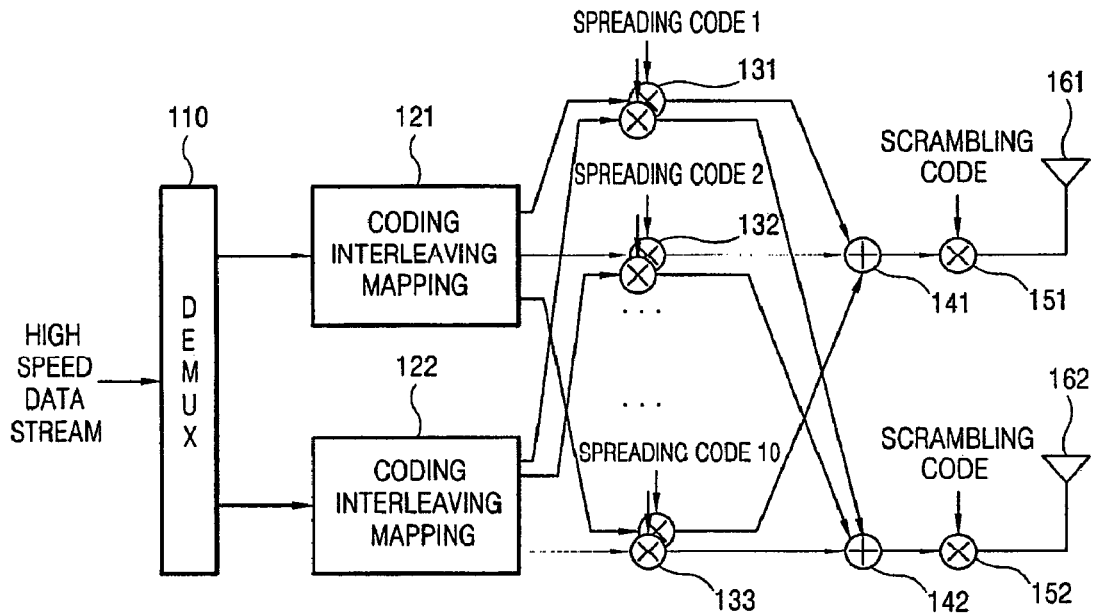
FIG. 1 is a view showing the construction of a transmitting end of a multi-input/multi-output (MIMO) communication system employing a PARC (Per-Antenna Rate Control) method in accordance with the conventional art.
Figure 2:
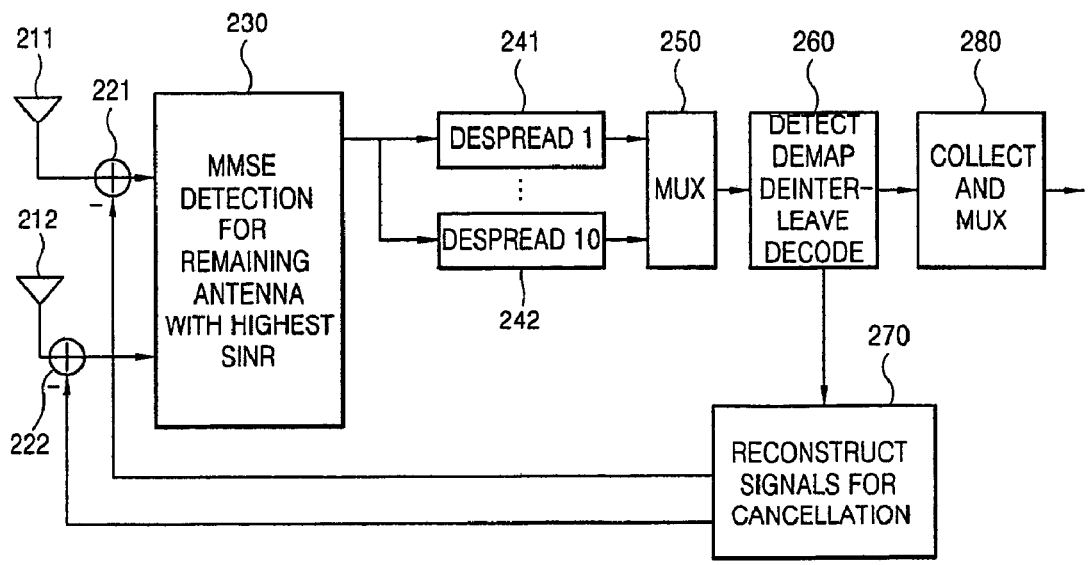
FIG. 2 is a view showing the construction of a receiving end of the MIMO communication system employing the PARC (Per-Antenna Rate Control) method in accordance with the conventional art.
Figure 3:
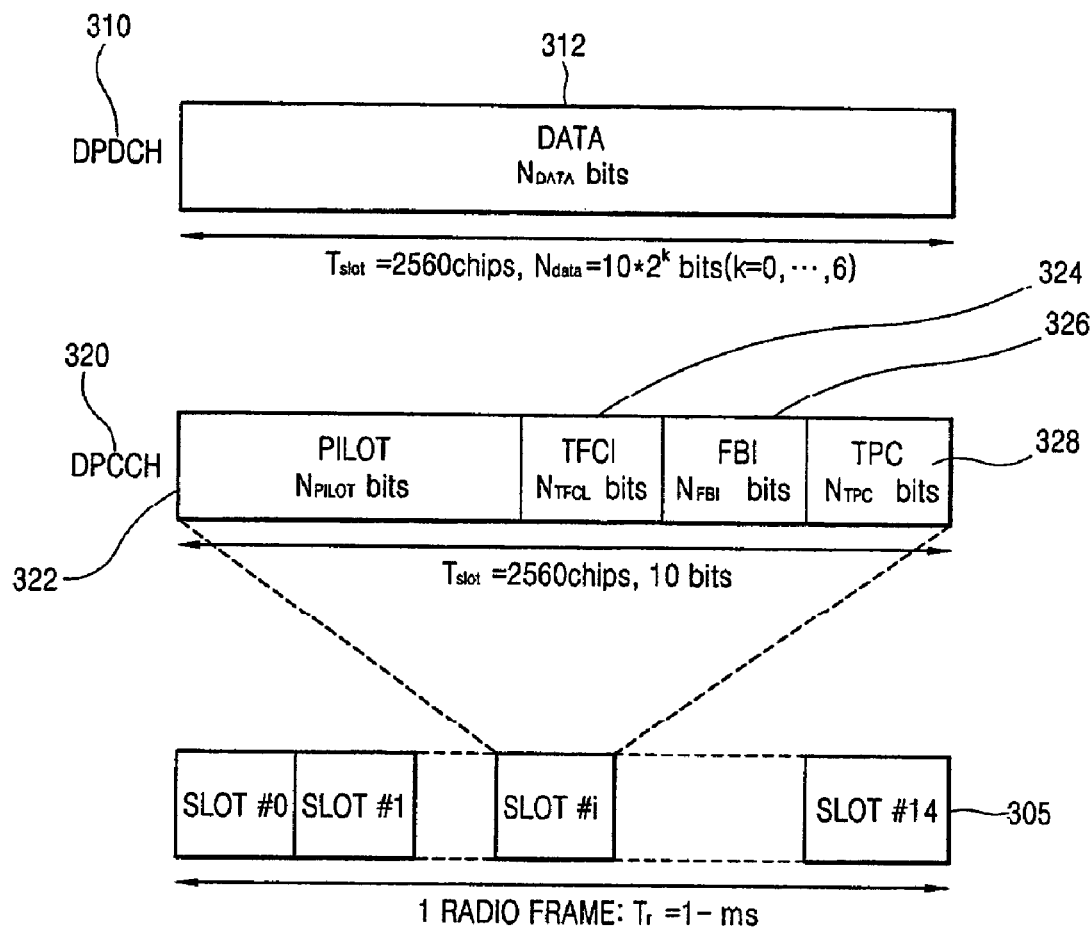
FIG. 3 is a view showing a reverse channel structure in a related art multi-input/multi-output (MIMO) system.
Figure 4:
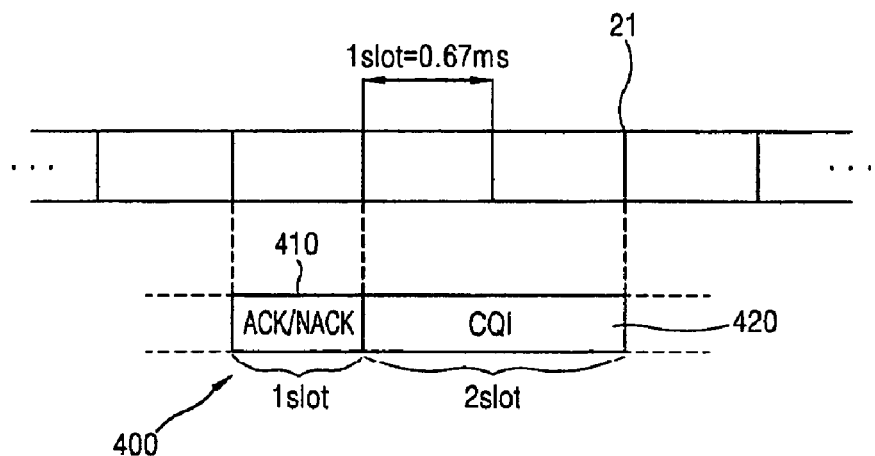
FIG. 4 is a view showing a reverse channel structure in a related art HSDPA system.

With reference to FIG. 5, the uplink control information transport channel 500 the uplink control information transport channel 500 is added to the reverse channel structure (not shown) of the related art MIMO system illustrated in FIG. 3.

Since the uplink control information transport channel 500 is added in the existing reverse channel structure, through which the receiving end can feedback certain control information to each transmission antenna of the transmitting end, and as mentioned above, a different data transmission rate (modulation and coding) can be applied to each transmission antenna according to a channel situation of each transmission antenna.

FIG. 5 shows one uplink control information transport channel 500 which is divided into sections as many as the number of transmission antennas, and each section is formed as one frame consisting of three fields (512, 514 and 516) allocated to each transmission antenna.

Namely, if it is assumed that the M number of transmission antennas are provided, the uplink control information transport channel 500 is divided into the M number of sections, and each of the M number of sections includes the frame 510 having three fields to which control information corresponding to each transmission antenna is allocated.

The frame 510 is a radio frame, and the three fields refer to the ACK/NACK 512 for the HARQ, the CQI 514 and the weight information 516 with respect to each transmission antenna, and in this case, each field can have the size of one slot.

In addition, information allocated to the three fields 512, 514 and 516 is control information to be separately applied to each transmission antenna, which includes, as mentioned above, the ACK/NACK 512 for the HARQ, the CQI 514 and other feedback information (referred to as hereinafter, the 'FBI'), namely, the weight information 516 transmitted by the receiving end to each transmission antenna of the transmitting end.

The CQI 514 includes a transmission block size, information on a modulation method, information on the number of HS-DSCH and power offset information with respect to the DPDCH for transmitting the HS-DSCH.

Of the control information, the weight information 516 can be a weight vector or a weight value with respect to each transmission antenna in a channel matrix estimated by the receiving end.

By feeding back the weight information 516 to each transmission antenna, the transmitting end can transmit data by using beam forming, whereby correlation of each transmission antenna can be used and thus more enhanced MIMO system can be accomplished.

Figure 6:
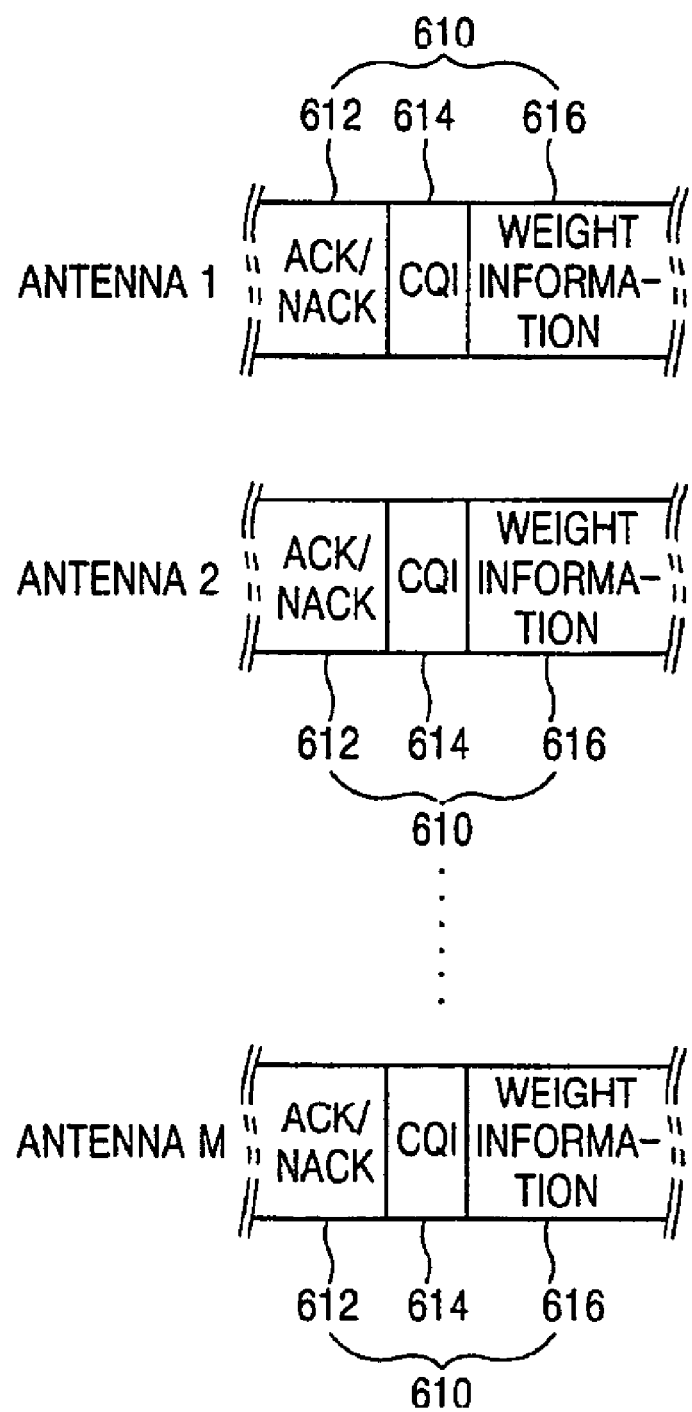
FIG. 6 a view showing an uplink control information transport channel in a MIMO communication system in accordance with another embodiment of the present invention.

FIG. 6 a view showing an uplink control information transport channel in a MIMO communication system in accordance with another embodiment of the present invention.

With reference to FIG. 6, an uplink control information transport channel 600 in accordance with another embodiment of the present invention is added to the reverse channel structure (not shown) in the related art MIMO system as illustrated in FIG. 3.

As shown, by including the uplink control information transport channel in the existing reverse channel structure, a receiving end can feed back certain control information to each transmission antenna of a transmitting end, and as stated above, a different data transmission rate (modulation and coding) can be applied to each transmission antenna according to a channel situation of each transmission antenna.

Unlike the uplink control information transport channel 500 in the former embodiment, in this embodiment, uplink control information transport channels 600 are provided as many as the transmission antennas, and each of the multiple uplink control signal transport channels 600 includes a frame 610 consisting of three fields 612, 614 and 616 allocated to each transmission antenna.

If it is assumed that the M number of transmission antennas are provided, the M number of uplink control information transport channels 600 are provided and each of the M number of uplink control information transport channel 600 includes the frame 610 including three fields to which control information corresponding to each transmission antenna has been allocated.

The frame 616 is a radio frame, and the three fields refer to the ACK/NACK 612 for the HARQ, the CQI 614 and the weight information 616 with respect to each transmission antenna, and in this case, each field can have the size of one slot.

In addition, information allocated to the three fields 612, 614 and 616 is control information to be separately applied to each transmission antenna, which includes, as mentioned above, the ACK/NACK 612 for the HARQ, the CQI 614 and other feedback information (referred to as hereinafter, the 'FBI'), namely, the weight information 616 transmitted by the receiving end to each transmission antenna of the transmitting end.

The CQI 614 includes a transmission block size, information on a modulation method, information on the number of HS-DSCH and power offset information with respect to the DPDCH for transmitting the HS-DSCH.

Of the control information, the weight information can be a weight vector or a weight value with respect to each transmission antenna in a channel matrix estimated by the receiving end.

By feeding back the weight information 516 to each transmission antenna, the transmitting end can transmit data by using beam forming, whereby correlation of each transmission antenna can be used and thus more enhanced MIMO system can be accomplished.

As so far described, the frame structure of the uplink control information transport channel in the MIMO communication system has the advantage in that because the control information for controlling each transmission antenna is effectively transmitted, signals transmitted from each transmission antenna of the MIMO system can be controlled in real time.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A frame of an uplink control information transport channel in a multi-input/multi-output (MIMO) communication system using multiple transmission antennas and multiple reception antennas, constructed such that the uplink control information transport channel for transmitting control information with respect to each of the multiple transmission antennas includes the frame, the frame comprising:
   a field for acknowledgement (ACK)/negative acknowledgement (NACK) for HARQ (Hybrid Automatic Retransmission Request);
   a field for CQI (Channel Quality Information); and a field for weight value information with respect to each of the multiple transmission antennas, wherein the uplink control information transport channel is divided into as many sections as number of the multiple transmission antennas, and each section comprises three fields allocated to each of the multiple transmission antennas, wherein the CQI includes at least one of a transmission block size, information on a modulation method, information on the number of a High Speed Downlink Shared Channel (HS-DSCH) and power offset information with respect to a Dedicated Physical Data Channel (DPDCH) for transmitting the HS-DSCH.

2. The structure of claim 1, wherein the frame is a radio frame.

3. The structure of claim 1, wherein each of the three fields has one slot.

4. The frame of claim 1, wherein the weight value information is either a weight vector or a weight value.

5. A frame of a plurality of uplink control information transport channels in a multi-input/multi-output (MIMO) communication system using multiple transmission antennas and multiple reception antennas, constructed such that the plurality of uplink control information transport channels for transmitting control information with respect to each of the multiple transmission antennas includes the frame, the frame comprising:

a field for acknowledgement (ACK)/negative acknowledgement (NACK) for HARQ (Hybrid Automatic Retransmission Request);

a field for CQI (Channel Quality Information); and a field for weight value information with respect to each of the multiple transmission antennas, wherein, the plurality of uplink control information transport channels are provided as many as a number of multiple transmission antennas, and each of the multiple uplink control information transport channel includes the frame comprising three fields allocated to each transmission antenna, wherein the CQI includes at least one of a transmission block size, information on a modulation method, information on the number of a High Speed Downlink Shared Channel (HS-DSCH) and power offset information with respect to a Dedicated Physical Data Channel (DPDCH) for transmitting the HS-DSCH.

6. The frame of claim 5, wherein the frame is a radio frame.

7. The frame of claim 5, wherein each of the three fields has one slot.

8. The frame of claim 5, wherein the weight value information is either a weight vector or a weight value.

* * * * *